US 6,637,873 B2

(12) United States Patent
Silverbrook et al.

(10) Patent No.: US 6,637,873 B2
(45) Date of Patent: *Oct. 28, 2003

(54) CARTRIDGE FOR A STICKER PRINTING DIGITAL CAMERA DEVICE

(75) Inventors: Kia Silverbrook, Balmain (AU); Tobin Allen King, Balmain (AU)

(73) Assignee: Silverbrook Research Pty Ltd., Balmain (AU)

(*) Notice: Subject to any disclaimer, the term of this patent is extended or adjusted under 35 U.S.C. 154(b) by 0 days.

This patent is subject to a terminal disclaimer.

(21) Appl. No.: 09/964,595

(22) Filed: Sep. 28, 2001

(65) Prior Publication Data

US 2002/0008745 A1 Jan. 24, 2002

Related U.S. Application Data

(63) Continuation of application No. 09/436,751, filed on Nov. 9, 1999, now Pat. No. 6,520,631.

(30) Foreign Application Priority Data

Nov. 9, 1998 (AU) ................................................ PP7027

(51) Int. Cl.⁷ ................................................ A41J 2/175
(52) U.S. Cl. ................................................ 347/86
(58) Field of Search .......................... 347/85–87, 214, 347/2; 396/429, 310; 358/906, 909.1

(56) References Cited

U.S. PATENT DOCUMENTS

| | | |
|---|---|---|
| 4,904,100 A | 2/1990 | Enix |
| 5,240,238 A | 8/1993 | Lee |
| 5,393,152 A | 2/1995 | Hattori et al. |
| 5,419,543 A | 5/1995 | Nakamura et al. |
| 5,462,375 A | 10/1995 | Isobe et al. |
| 5,467,118 A | 11/1995 | Gragg et al. |
| 5,559,932 A | 9/1996 | Machida et al. |
| 5,784,959 A * | 7/1998 | Larios ........................ 101/219 |
| 5,792,249 A | 8/1998 | Shirota et al. |
| 5,847,836 A * | 12/1998 | Suzuki ....................... 358/296 |
| 5,949,467 A | 9/1999 | Gunther et al. |
| 5,971,533 A | 10/1999 | Kinoshita et al. |
| 5,971,641 A | 10/1999 | Looney |
| 5,992,994 A | 11/1999 | Rasmussen et al. |
| 5,995,772 A | 11/1999 | Barry et al. |
| 6,091,909 A * | 7/2000 | McIntyre et al. ........... 396/278 |
| 6,147,704 A | 11/2000 | Ito et al. |
| 6,149,256 A | 11/2000 | McIntyre et al. |
| 6,188,430 B1 | 2/2001 | Motai |
| 6,276,850 B1 * | 8/2001 | Silverbrook et al. ........... 347/2 |
| 6,317,156 B1 | 11/2001 | Nagasaki et al. |
| 6,362,868 B1 | 3/2002 | Silverbrook |

* cited by examiner

*Primary Examiner*—Judy Nguyen

(57) ABSTRACT

A cartridge for a printing device includes a casing defining a first container portion for housing a supply of stickers and a second container portion for storing an ink supply. The second container portion is divided into a number of distinct chambers for storing different colored inks and the first container is arranged to hold the stickers in a roll form. The cartridge can require some form of authentication by the printing device with which it is to be used. The cartridge can be specifically configured for use with a sticker printing digital camera device.

8 Claims, 11 Drawing Sheets

CARTRIDGE FOR A STICKER PRINTING DIGITAL CAMERA DEVICE

This is a Continuation application of U.S. Ser. No. 09/436,751 filed on Nov. 9, 1999 Now U.S. Pat. No. 6,520,631.

FIELD OF THE INVENTION

The present invention relates to cartridges for printing systems. The cartridge has been developed originally as a cartridge for a sticker printing digital camera device that is preferably sized to be hand held and will be described hereinafter with reference to this application. However, it will be appreciated by those skilled in the art that the cartridge can be used with many other kinds and types of printer devices where it is desired to print ink onto adhesive print media.

SUMMARY OF THE INVENTION

There is disclosed herein a cartridge for fitting to a printing camera device having a view finder therein, said cartridge including:

a cartridge casing defining a first container portion of generally annular configuration including an inner annular wall and a side wall for housing therebetween a supply of adhesive coated print media on a roll of backing material and a second container portion for storing an ink supply, wherein the printing device uses ink from said ink supply to print on said print media and said inner annular wall surrounds said view finder when said cartridge is fitted to the printing camera device.

Preferably said second container portion is divided into a plurality of distinct chambers for storing different colored inks.

Preferably the ink storage container includes one or more ink outlets that are pierced upon installation with the printing device.

Preferably the cartridge includes authentication means recognisable by the printing device.

Preferably the second container portion extends generally radially outwardly from the first container portion.

Preferably the casing is adapted to snap fit with the printing device.

Preferably the casing includes an exit opening through which said print media passes and a further opening receiving a pick up roller from the printing device.

Preferably said print media and said ink supply are replenished simultaneously.

BRIEF DESCRIPTION OF THE DRAWINGS

A preferred example of the inventive cartridge will now be described, by way of example only, by reference to the accompanying drawings in which.

DESCRIPTION OF PREFERRED AND OTHER EMBODIMENTS

Figure 1:
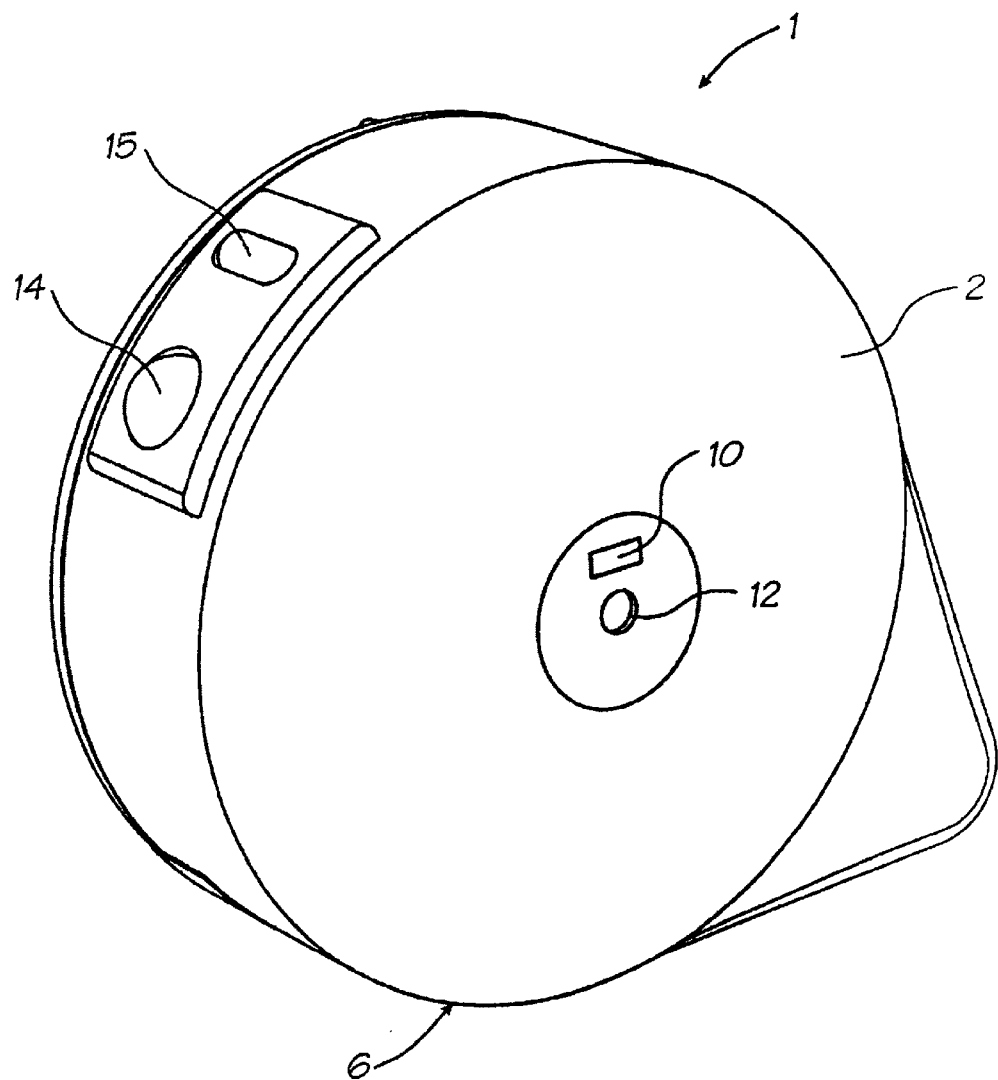
FIG. 1 is a front perspective view of a sticker printing camera.
Figure 2:
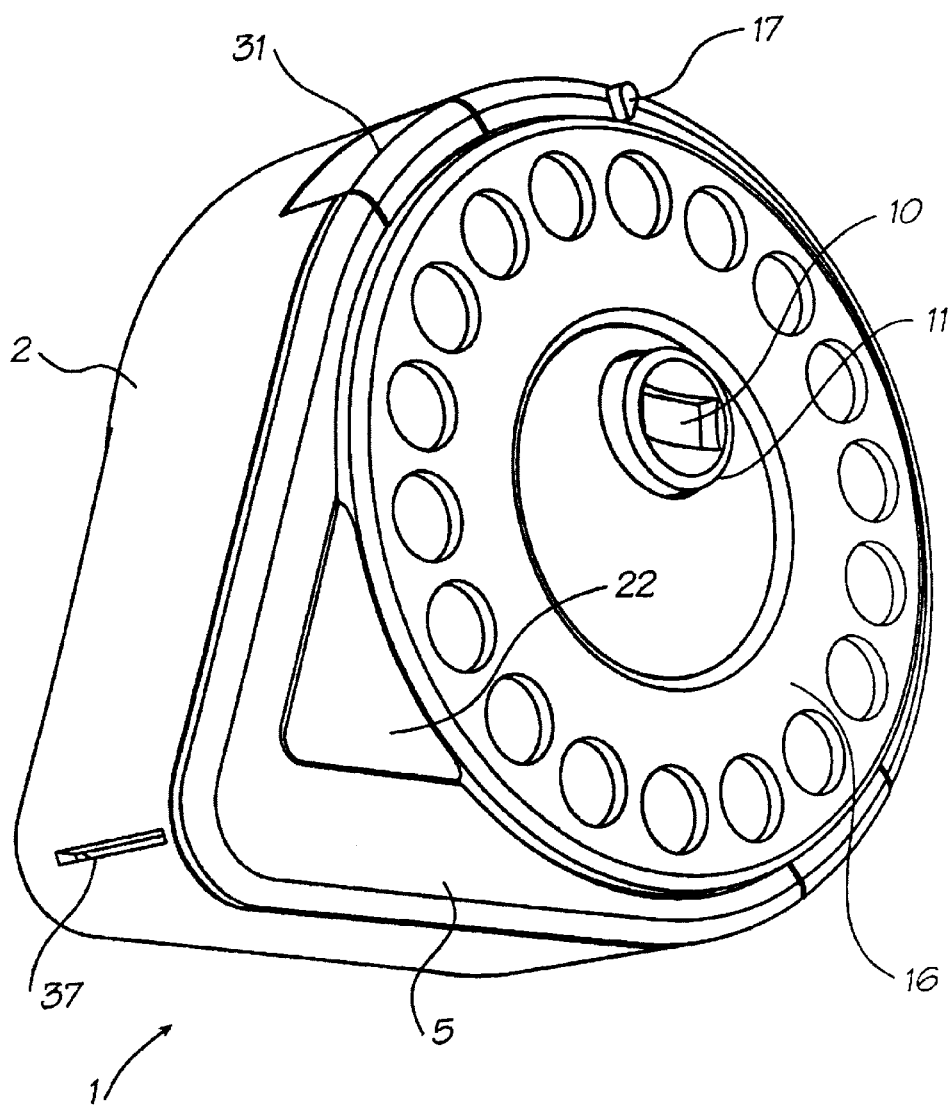
FIG. 2 is a rear perspective view of the sticker printing camera of FIG. 1.
Figure 3:
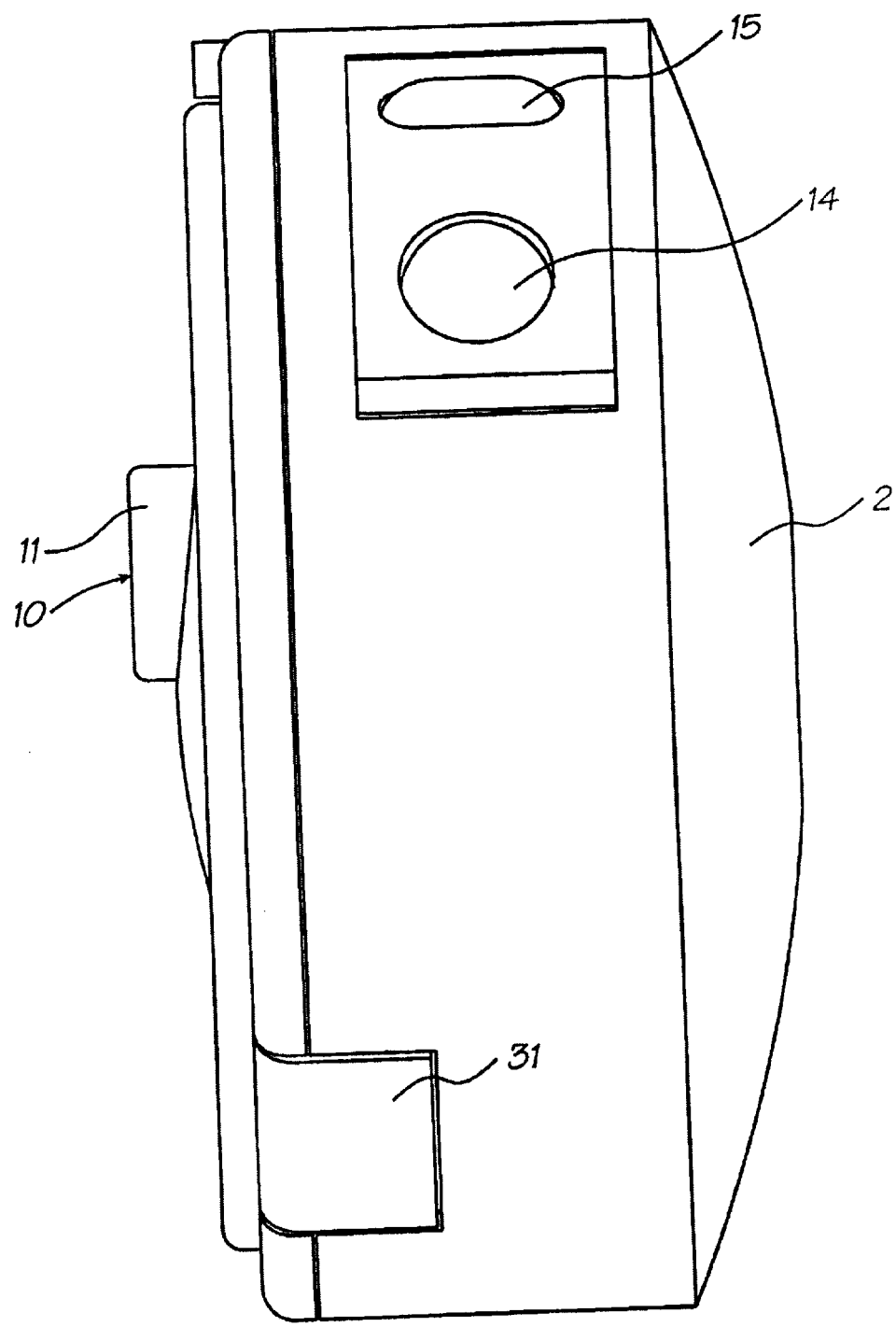
FIG. 3 is a left hand side view of the sticker printing camera of the previous figures.
Figure 4:
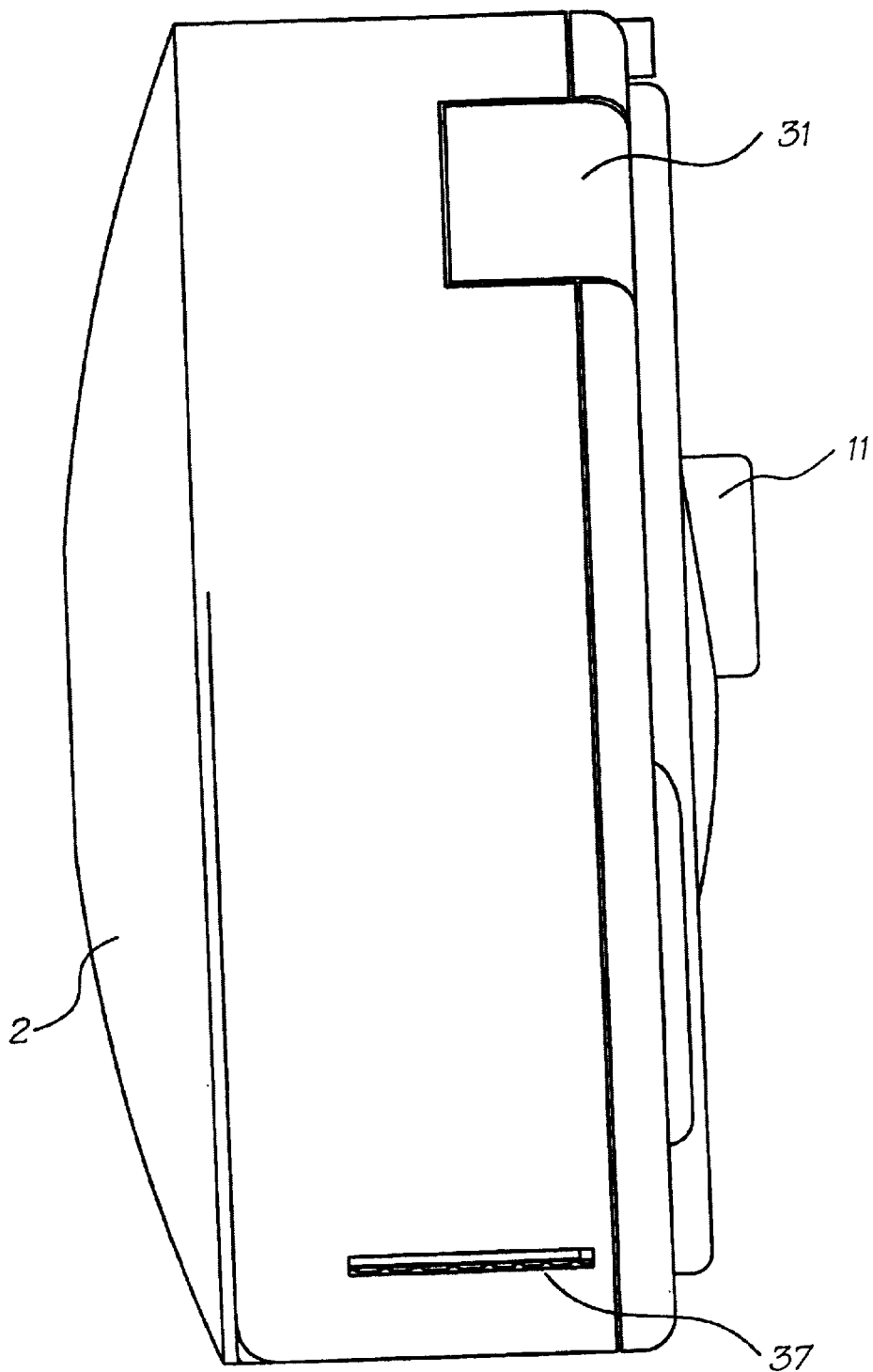
FIG. 4 is a right hand side view of the sticker printing camera of the previous figures.

The preferred application of the cartridge is to a sticker printing camera able to print stickers on demand on a replenishable printroll. The "stickercam" 1 as illustrated in the accompanying figures has a multi-part housing defined by an external front cover moulding 2, an internal substructure and rear molding 3, a sticker and ink cartridge molding 4 and an external rear cover 5.

The housing in the illustrated preferred embodiment is generally tear drop shaped in elevation, the generally circular portion 6 being adapted to store stickers in a printroll form and the remaining portion housing the ink supply 7, printhead arrangement 8 and sticker feed mechanism 9.

The view finder 10 is also disposed at or near the centre of the circular housing portion 6 and extends fully through the casing from the front cover 2 to an optional eye piece 11 on the rear. The casing includes an inner annular wall 50 about which the sticker roll 18 is received. The annular wall 50 surrounds the view finder 10. Provided immediately below the view finder 10 at the front of the casing is a camera lens 12 which is operatively associated with the suitable image sensing and processing means such as the CCD 13 shown in FIG. 12. Further, a "take" button 14 is provided at the top of the casing together with a "print" button 15 for taking and printing images respectively.

The preferred "stickercam" as illustrated also includes an "effects dial" 16 which is rotatable so as to implement a series of effects such as normal, black and white, sepia, soft blending, etc. It can also be used for the addition of graphical clip arts such as love hearts, flowers, surprise effects etc. On the dial, a series of icon pictures may be provided on which is printed an indicator of the effect. The effect placed at the indicator marker 17 is the one then applied by the camera. The effect dial can be implemented by placing a series of conductive segments on the reverse side of the wheel with the conductive segments forming a binary pattern indicative of the type of effect to be displayed. The segments can complete a circuit monitorable by the stickercam so as to provide for the effect.

The stickers are provided in the form of a sticker roll 18 which is preferably housed in a cartridge assembly 19 according to the present invention which is releasably secured to the external casing. This first preferred form of the cartridge is of a similar shape and structure to the external housing of the camera device and comprises a top molding 20 which defines a first generally annular sticker roll containing portion 21 and a second generally triangular sectioned ink storage portion 22. The ink storage portion is preferably divided into a plurality of distinct chambers 23 so as to provide for both color and black and white printing. Two slots are also provided in the side wall of the cartridge top molding, the first being a sticker exit slot 24 and the second being a pick up roller slot 25 which forms part of the sticker feed mechanism 27 that is described in more detail below. The cartridge 19 also includes a base molding 28 which seals both the sticker roll cavity and the ink chambers. Preferably, ink outlet perforations 29 are provided in the base molding that are covered by a sealing film that is pierced during installation so as to be in fluid communication with a printer mechanism 30. Desirably, the cartridge is a sealed unit such that the stickers and ink supply are to be replenished simultaneously. Conveniently, the cartridge may be snap fitted with the external housing by means of pressure snap mounts 31 shown in the drawings.

Figure 7:
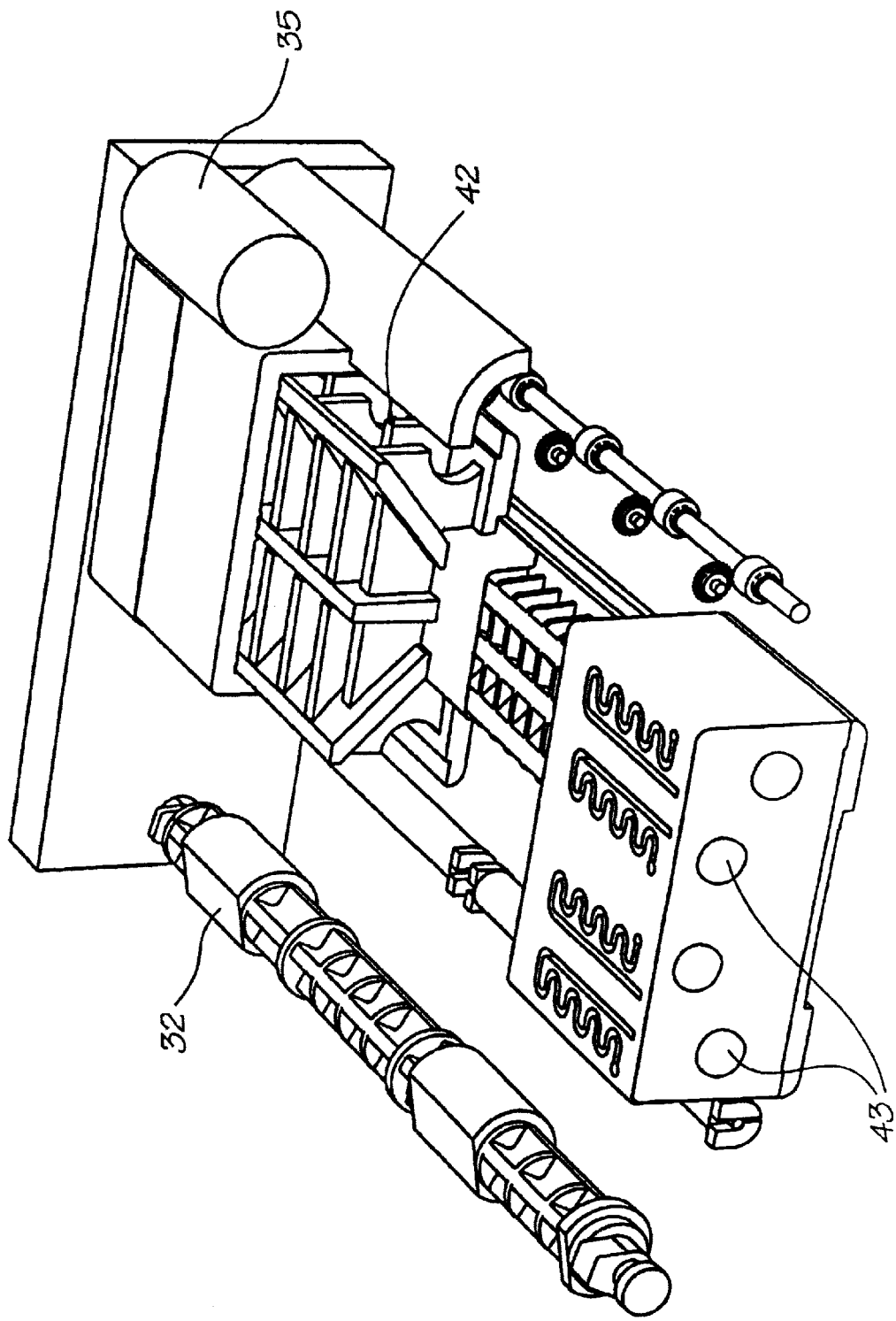
FIG. 7 is an enlarged perspective view of the printer mechanism shown in FIG. 6.
Figure 8:
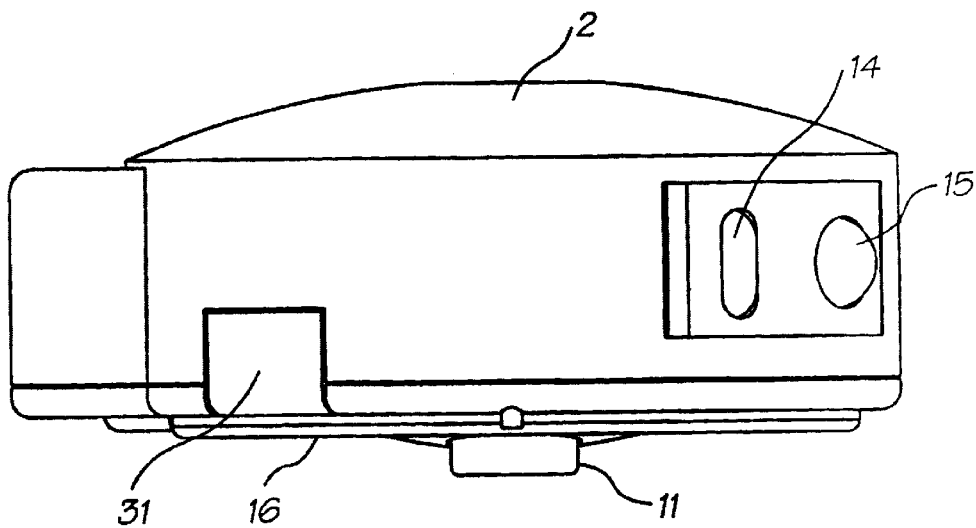
FIG. 8 is a top plan view of the device shown in FIGS. 1–5.
Figure 9:
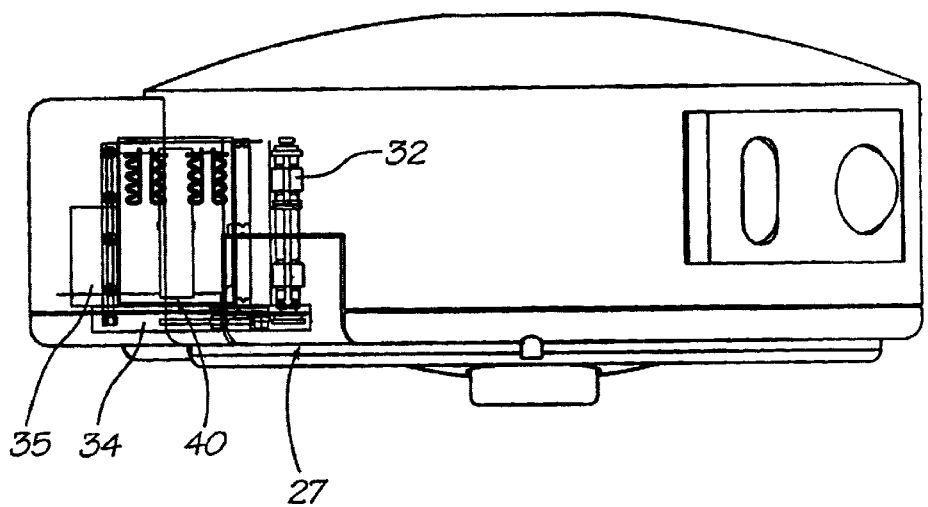
FIG. 9 is a part sectioned top plan view showing detail of the printer mechanism shown in FIGS. 6 and 7.
Figure 10:
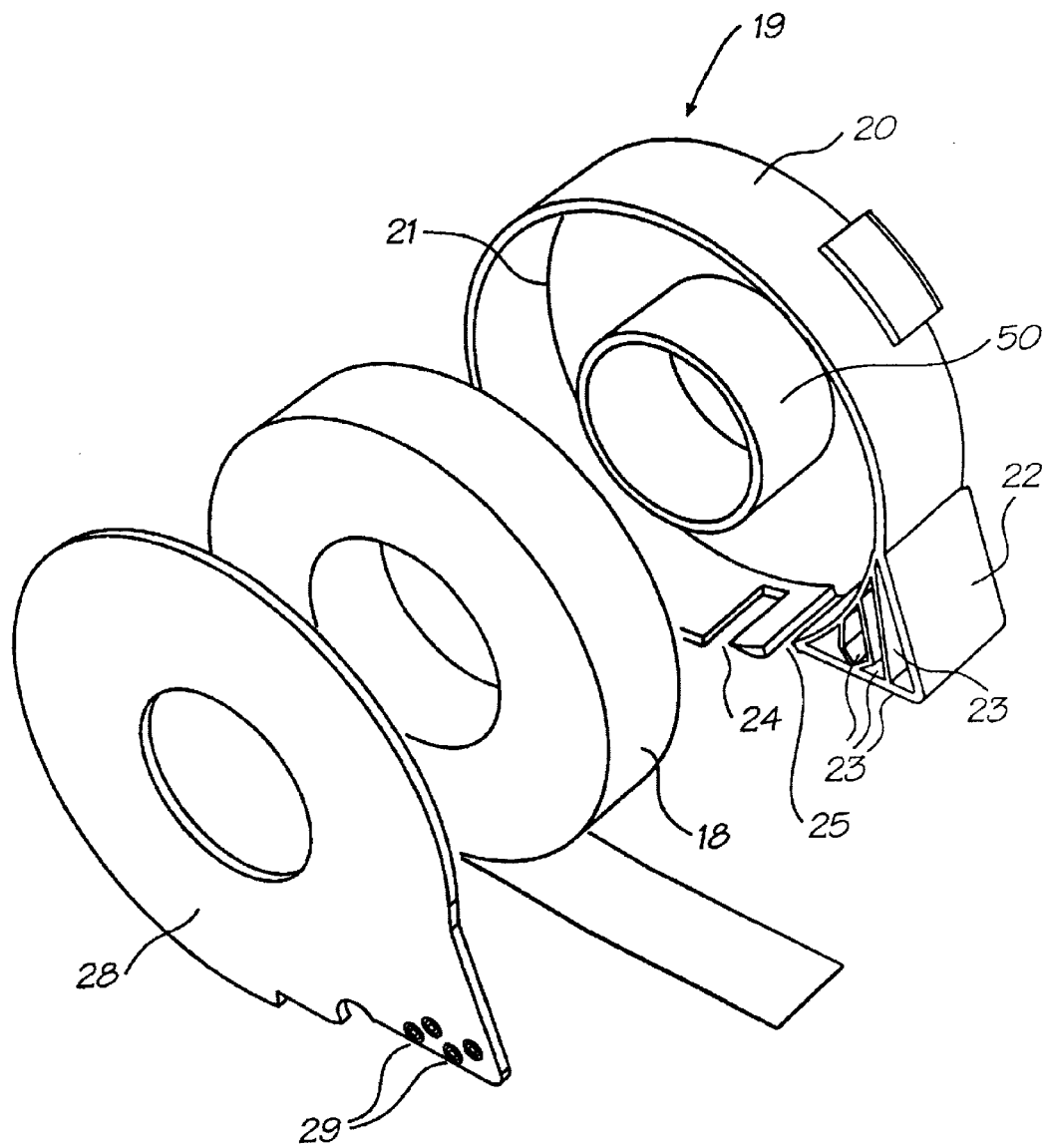
FIG. 10 is an exploded perspective view of the first embodiment sticker roll and ink cartridge of the invention.
Figure 11:
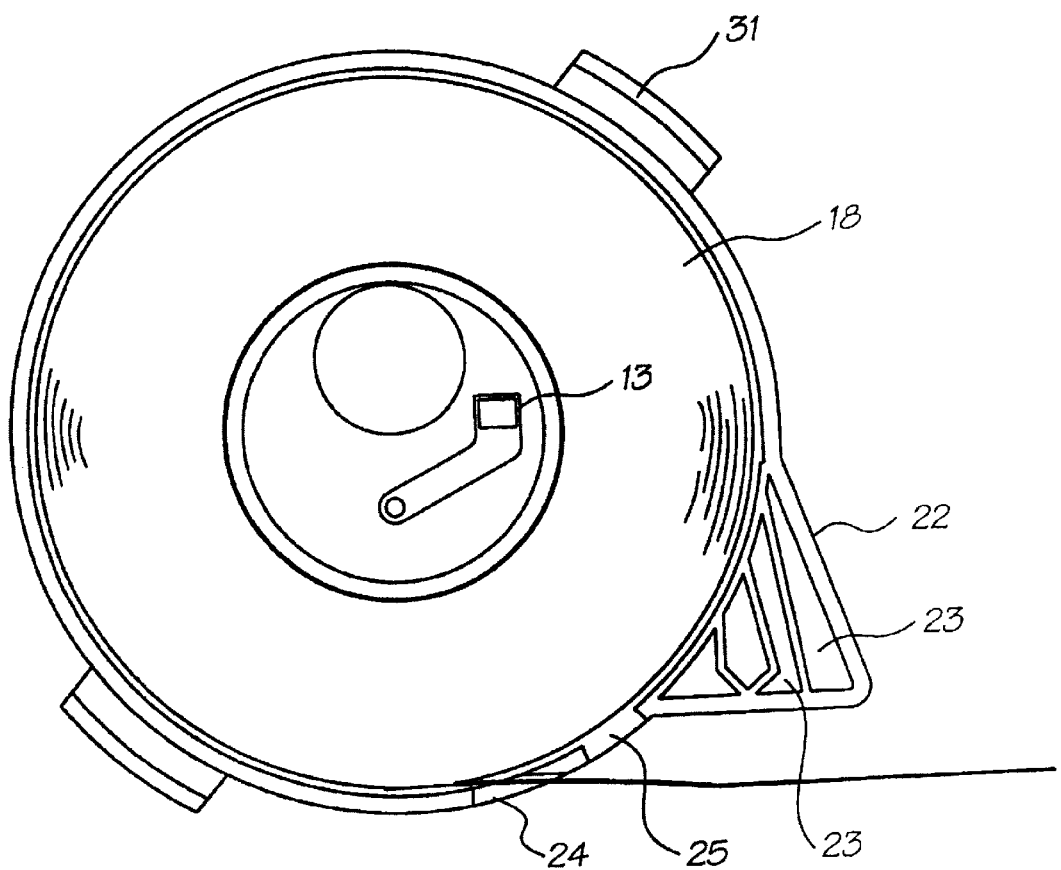
FIG. 11 is a front view of the sticker roll and ink cartridge shown with the base moulding removed.
Figure 12:
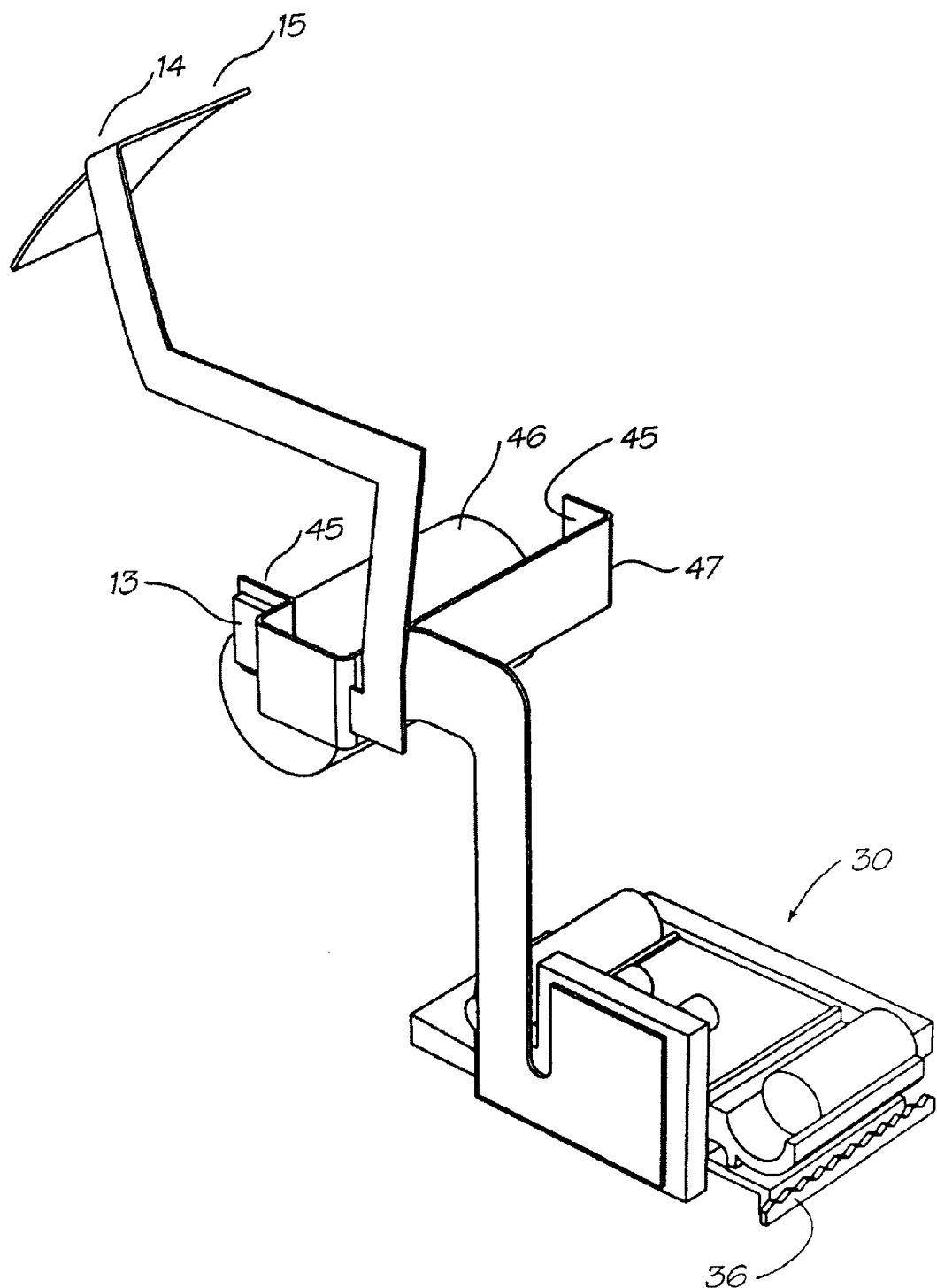
FIG. 12 is a perspective view showing the inner components of the electrical control circuitry.

The sticker feed mechanism 27 and printer mechanism 30 are best illustrated in FIGS. 7, 9 and 12. The sticker feed mechanism 27 includes a pick up roller 32 which spools the stickers forward once the cartridge has been inserted in the outer housing. Adjacent the pick up roller are several pairs of drive rollers or nip rollers 33 which are operated via an appropriate gear chain 34 by the motor 35. A serrated cutter 36 may also be provided as part of the feed sub-assembly and arranged so as to be adjacent the printed sticker outlet 37 that is formed as part of the housing front molding 2. Alternatively, a guillotine type arrangement could be provided.

Figure 6:
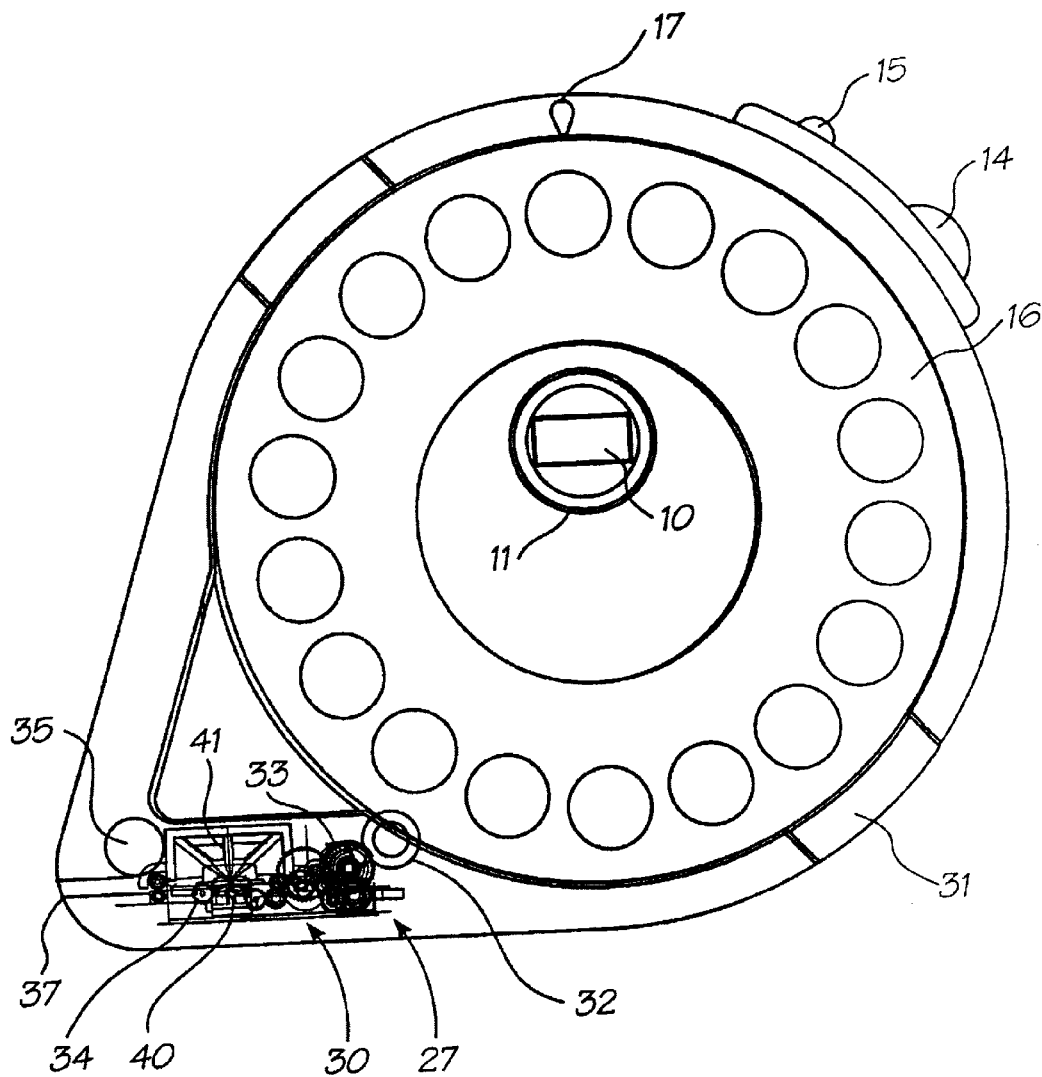
FIG. 6 is a rear view of the sticker printing camera from the previous figures with the uppermost cover portions removed to illustrate the sticker storage area, ink supply, feeder and printer mechanism.

The printer mechanism 30 is best shown in FIGS. 6 and 7 and comprises a page width printhead chip 40 with an ink distribution unit 41. Forming part of the ink distribution unit is an ink supply connection manifold 42 which has a plurality of ink inlet projections 43 which engage the ink outlet perforations 29 on the sticker roll and ink cartridge 19. Preferably, the printer mechanism and sticker feed mechanism are a single unit and are detachable for replacement or repair.

Figure 5:
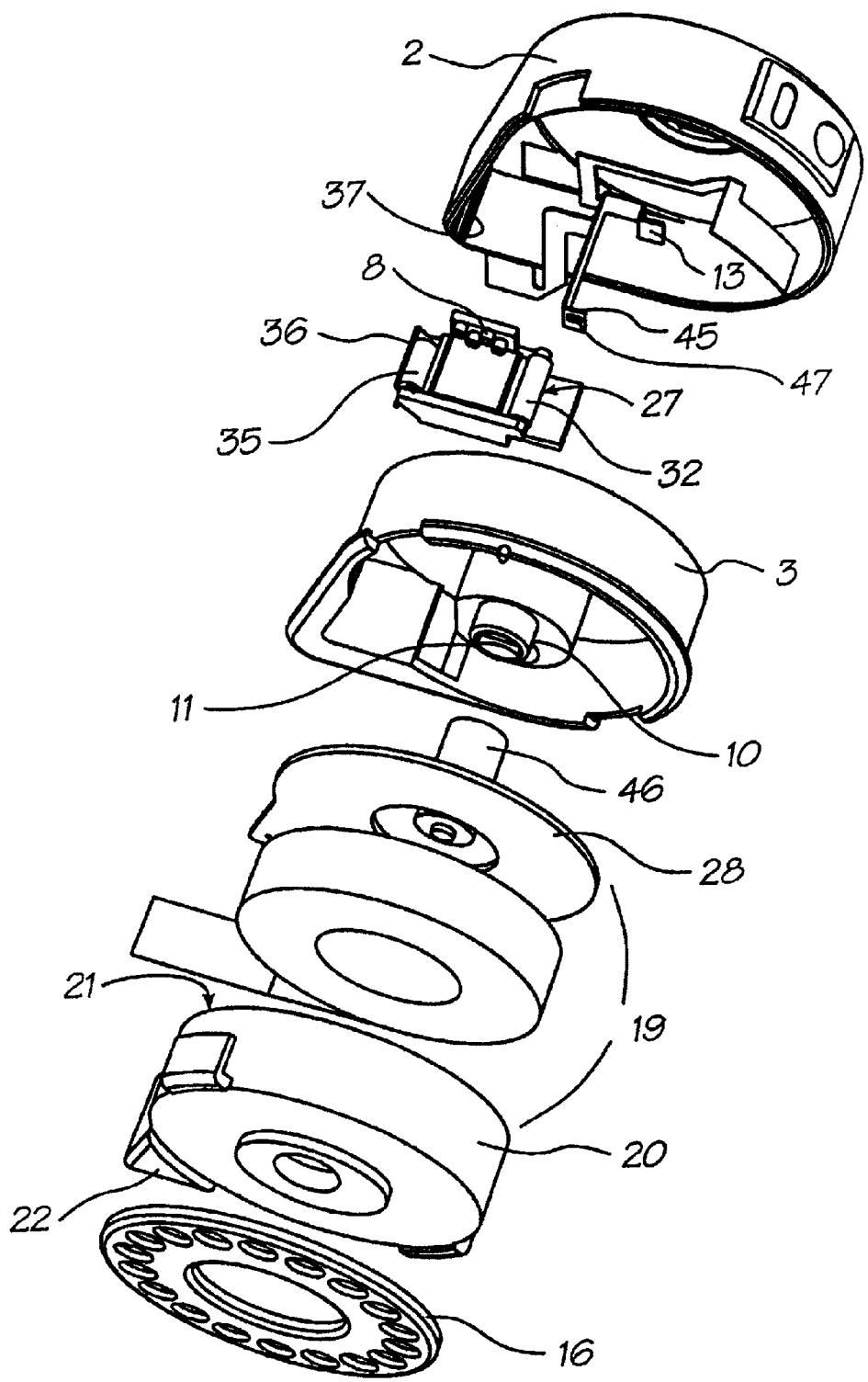
FIG. 5 is an exploded perspective view of the sticker printing camera device as shown in FIG. 1 including a first embodiment sticker printroll and ink cartridge of the invention.

Turning now to FIG. 12 (and FIG. 5), there is shown a schematic arrangement of a part of the electrical circuitry for the control and operation of the stickercam device. As can be seen, a simple flexible PCB harness can be used to interconnect the take and print buttons 14 and 15 to the CCD 13 and the printhead assembly 30. Also provided as part of the circuit are contacts 45 for the power supply which is preferably in the form of a three volt battery 46. Further, the detachable printhead and/or sticker and ink supply cartridge preferably include an authentication mechanism such as that outlined in applicant's earlier U.S. Pat. No. 6,362,868. The authentication chip contact 47 is shown in FIG. 12.

In use, the "stickercam" is oriented toward the target subject and the take button 14 is then operated to capture the image. The effects dial 16 can then be rotated and an effect selected. When the print button 15 is then operated the sticker feed mechanism 27 delivers the next sticker or portion of sticker media to the printhead assembly 30 for printing of the effect processed image thereon.

Numerous variations are possible within the overall inventive concept of the "stickercam". For example, the preferred embodiment can be implemented as a rearrangement of the system disclosed in U.S. Pat. No. 6,231,148 also filed by the present applicant. Advantageously, the image sensor can be of a reduced size to that described in the above referenced U.S. Pat. No. 6,231,148 due to the small size of the stickers.

Similarly, the electronics of the stickercam can be based around a CMOS images sensor 13 which also includes processing circuitry for processing an image and forwarding it to the printhead 40 for printing. The operation of the internal control electronics can be substantially as set out in the aforementioned U.S. Pat. No. 6,231,148.

Although the invention has been described with reference to one specific examples, it will be appreciated by those skilled in the art that the inventive cartridge can be embodied in many other forms and adapted for use with printers and printer applications of all kinds and types.

What is claimed is:

1. A cartridge for fitting to a printing camera device having a view finder therein, said cartridge including:
   a cartridge casing defining a first container portion of generally annular configuration including an inner annular wall and a side wall for housing therebetween a supply of adhesive coated print media on a roll of backing material and a second container portion for storing an ink supply, wherein the printing device uses ink from said ink supply to print on said print media and said inner annular wall surrounds said view finder when said cartridge is fitted to the printing camera device.

2. A cartridge according to claim 1 wherein said second container portion is divided into a plurality of distinct chambers for storing different colored inks.

3. A cartridge according to claim 1 wherein said second container portion includes one or more ink outlets that are pierced upon installation with the printing device.

4. A cartridge according to claim 1 including authentication means recognisable by the printing device.

5. A cartridge according to claim 1 wherein the second container portion extends generally radially outwardly from the first container portion.

6. A cartridge according to claim 1 wherein the casing is adapted to snap fit with the printing device.

7. A cartridge according to claim 1 wherein the casing includes an exit opening through which said print media passes and a further opening receiving a pick up roller from the printing device.

8. A cartridge according to claim 1 wherein said print media and said ink supply are replenished simultaneously.

* * * * *